United States Patent
Ols et al.

(10) Patent No.: US 10,641,114 B2
(45) Date of Patent: May 5, 2020

(54) TURBINE VANE WITH NON-UNIFORM WALL THICKNESS

(71) Applicant: United Technologies Corporation, Hartford, CT (US)

(72) Inventors: John T. Ols, Northborough, MA (US); Richard N. Allen, West Hartford, CT (US); Steven D. Porter, Wethersfield, CT (US)

(73) Assignee: United Technologies Corporation, Farmington, CT (US)

( * ) Notice: Subject to any disclaimer, the term of this patent is extended or adjusted under 35 U.S.C. 154(b) by 828 days.

(21) Appl. No.: 14/787,349

(22) PCT Filed: May 20, 2014

(86) PCT No.: PCT/US2014/038723
§ 371 (c)(1),
(2) Date: Oct. 27, 2015

(87) PCT Pub. No.: WO2015/023331
PCT Pub. Date: Feb. 19, 2015

(65) Prior Publication Data
US 2016/0061046 A1    Mar. 3, 2016

Related U.S. Application Data

(60) Provisional application No. 61/832,989, filed on Jun. 10, 2013.

(51) Int. Cl.
*F01D 9/04* (2006.01)
*F01D 5/14* (2006.01)
*F01D 25/24* (2006.01)

(52) U.S. Cl.
CPC ............. *F01D 9/041* (2013.01); *F01D 5/143* (2013.01); *F01D 9/042* (2013.01); *F01D 9/047* (2013.01);
(Continued)

(58) Field of Classification Search
CPC .................................. F01D 5/143; F01D 5/145
See application file for complete search history.

(56) References Cited

U.S. PATENT DOCUMENTS

| 4,511,306 A | 4/1985 | Hultgren |
| 6,371,725 B1 | 4/2002 | Manteiga et al. |

(Continued)

FOREIGN PATENT DOCUMENTS

| GB | 2445075 A | 6/2008 |
| WO | 9954597 A1 | 10/1999 |

OTHER PUBLICATIONS

International Search Report for PCT Application No. PCT/US2014/038748 dated Sep. 18, 2014.
(Continued)

*Primary Examiner* — Justin D Seabe
(74) *Attorney, Agent, or Firm* — Carlson, Gaskey & Olds, P.C.

(57) ABSTRACT

A vane for use in a gas turbine engine has an airfoil extending between a leading edge and a trailing edge, and is generally hollow. The vane has a radially outer platform and a radially inner platform. At least one of the radially inner and radially outer platforms has thicker portions circumferentially located beyond one of the leading edge and the trailing edge, and thinner portions circumferentially beyond circumferential edges of the airfoil. A mid-turbine frame and a gas turbine engine are also disclosed.

8 Claims, 4 Drawing Sheets

(52) U.S. Cl.
CPC ........ *F01D 25/24* (2013.01); *F05D 2240/121* (2013.01); *F05D 2240/122* (2013.01); *F05D 2240/80* (2013.01); *Y02T 50/673* (2013.01)

(56) References Cited

U.S. PATENT DOCUMENTS

| | | | |
|---|---|---|---|
| 6,511,294 | B1 | 1/2003 | Mielke et al. |
| 6,561,761 | B1 | 5/2003 | Decker et al. |
| 6,669,445 | B2 | 12/2003 | Staubach et al. |
| 7,198,472 | B2 | 4/2007 | McMillan et al. |
| 8,206,115 | B2 * | 6/2012 | Gupta ............... F01D 5/143 |
| | | | 415/211.2 |
| 8,424,313 | B1 | 4/2013 | Praisner et al. |
| 8,720,207 | B2 * | 5/2014 | Gersbach ........... F01D 5/143 |
| | | | 415/191 |
| 8,961,134 | B2 * | 2/2015 | Beeck ............... F01D 5/143 |
| | | | 416/193 A |
| 9,657,575 | B2 * | 5/2017 | Okita ............... F01D 5/186 |
| 2002/0076324 | A1 | 6/2002 | Abuaf et al. |
| 2004/0062636 | A1 | 4/2004 | Mazzola et al. |
| 2006/0275112 | A1 | 12/2006 | Lee et al. |
| 2008/0181766 | A1 | 7/2008 | Campbell et al. |
| 2010/0158696 | A1 | 6/2010 | Pandey et al. |
| 2010/0172749 | A1 * | 7/2010 | Mitsuhashi ......... F01D 5/143 |
| | | | 415/193 |
| 2010/0278644 | A1 | 11/2010 | Gersbach et al. |
| 2011/0008163 | A1 | 1/2011 | Prentice et al. |
| 2011/0081228 | A1 | 4/2011 | Durocher et al. |
| 2013/0067930 | A1 | 3/2013 | Paradis |
| 2013/0239541 | A1 * | 9/2013 | Shepherd ........... F01D 5/143 |
| | | | 60/39.83 |

OTHER PUBLICATIONS

Supplementary European Search Report for European Application No. 14836398.9 dated Aug. 1, 2016.
Singapore Search Report for Singapore Application No. 11201508706R completed Dec. 30, 2015.
International Preliminary Report on Patentability for International Application No. PCT/US2014/038723 dated Dec. 23, 2015.

* cited by examiner

TURBINE VANE WITH NON-UNIFORM WALL THICKNESS

CROSS-REFERENCE TO RELATED APPLICATION

This application claims priority to U.S. Provisional Application No. 61/832,989, filed Jun. 10, 2013.

BACKGROUND OF THE INVENTION

This application relates to a vane for use as a static element in a gas turbine engine, wherein a platform is provided with a thickness that increases adjacent to a portion where an airfoil merges into the platform.

Gas turbine engines are known, and typically include a compressor delivering air into a combustion section where it is mixed with fuel and ignited. Products of this combustion pass downstream over turbine rotors, driving them to rotate. Static vanes are often positioned between adjacent turbine rotors and serve to redirect flow such that it is in a desired condition when it reaches a downstream turbine rotor.

One such location is a mid-turbine frame positioned between a higher pressure turbine rotor and a lower pressure turbine rotor. A mid-turbine frame typically includes vanes having a radially outer platform and a radially inner platform and an airfoil extending between the two platforms. The vanes are subject to a number of stresses, and designing the vanes to address those stresses is challenging.

SUMMARY OF THE INVENTION

In a featured embodiment, a vane for use in a gas turbine engine has an airfoil extending between a leading edge and a trailing edge, and is generally hollow. The vane has a radially outer platform and a radially inner platform. At least one of the radially inner and radially outer platforms has thicker portions circumferentially located beyond one of the leading edge and the trailing edge, and thinner portions circumferentially beyond circumferential edges of the airfoil.

In another embodiment according to the previous embodiment, the at least one platform is the radially inner platform.

In another embodiment according to any of the previous embodiments, the thicker portions vary in thickness, and extend circumferentially beyond circumferential edges of the airfoil.

In another embodiment according to any of the previous embodiments, a radial thickness of the thicker portion at a thickest portion compared to a radial thickness of thinner portions circumferentially spaced from the thicker portions is equal to or between about 1.1 and 5.0.

In another embodiment according to any of the previous embodiments, the thicker portions are provided by at least one thicker bump positioned axially beyond the leading edge, but circumferentially aligned with the airfoil.

In another embodiment according to any of the previous embodiments, there are at least a plurality of the bumps.

In another embodiment according to any of the previous embodiments, a radial thickness of a thickest portion of the bump is defined, and a ratio of the radial thickness of the thickest portion of the bump to a radially thickness of portions circumferentially spaced from the bump is equal to or between about 1.1 and 5.0.

In another embodiment according to any of the previous embodiments, the one of the leading edge and the trailing edge is the leading edge.

In another featured embodiment, a mid-turbine frame has a plurality of vanes with airfoils extending between a radially inner and a radially outer platform. The airfoil shape extends between a leading edge and a trailing edge, and is generally hollow. At least one of the radially inner and radially outer platforms has thicker portions circumferentially located beyond the leading edge, and thinner portions circumferentially beyond circumferential edges of the airfoil.

In another embodiment according to the previous embodiment, the thicker portions vary in thickness, and extend circumferentially beyond circumferential edges of the airfoil.

In another embodiment according to any of the previous embodiments, a radial thickness of the thicker portion at a thickest portion compared to a radial thickness of thinner portions circumferentially spaced from the thicker portions is equal to or between about 1.1 and 5.0.

In another embodiment according to any of the previous embodiments, the thicker portions are provided by at least one thicker bump positioned axially beyond the leading edge, but circumferentially aligned with the airfoil.

In another embodiment according to any of the previous embodiments, a radial thickness of a thickest portion of the bump is defined, and a ratio of the radial thickness of the thickest portion of the bump to a radially thickness of portions circumferentially spaced from the bump is equal to or between about 1.1 and 5.0.

In another embodiment according to any of the previous embodiments, there are at least a plurality of the bumps.

In another featured embodiment, a gas turbine engine has at least a first upstream turbine rotor and a downstream turbine rotor, with a mid-turbine frame located intermediate the upstream and downstream turbine rotors. The mid-turbine frame includes a plurality of vanes having a radially outer platform and a radially inner platform. An airfoil extends between a leading edge and a trailing edge, is being generally hollow. At least one of the radially inner and radially outer platforms has thicker portions circumferentially located beyond the leading edge, and thinner portions circumferentially beyond circumferential edges of the airfoil.

In another embodiment according to the previous embodiment, the at least one platform is the radially inner platform.

In another embodiment according to any of the previous embodiments, the thicker portions vary in thickness, and extend circumferentially across circumferential edges of the airfoil.

In another embodiment according to any of the previous embodiments, a radial thickness of the thicker portion at a thickest portion compared to a radial thickness of thinner portions circumferentially spaced from the thicker portions is equal to or between about 1.1 and 5.0.

In another embodiment according to any of the previous embodiments, the thicker portions are provided by at least one thicker bump positioned axially beyond the leading edge, but circumferentially aligned with the airfoil.

In another embodiment according to any of the previous embodiments, a radial thickness of a thickest portion of the bump is defined, and a ratio of the radial thickness of the thickest portion of the bump to a radially thickness of portions circumferentially spaced from the bump is equal to or between about 1.1 and 5.0.

These and other features may be best understood from the following drawings and specification, the following which is a brief description.

DETAILED DESCRIPTION

Figure 1:
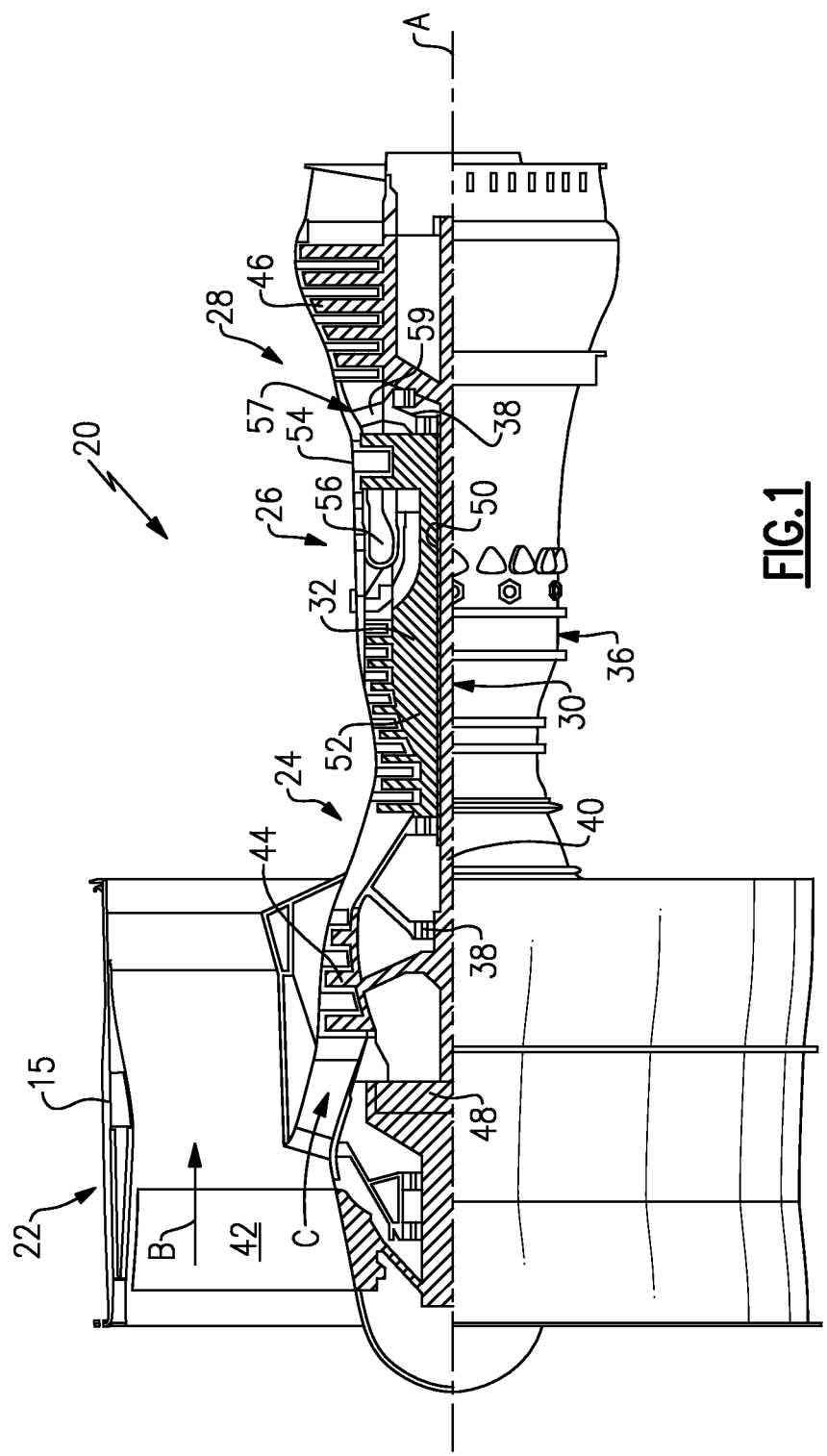
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
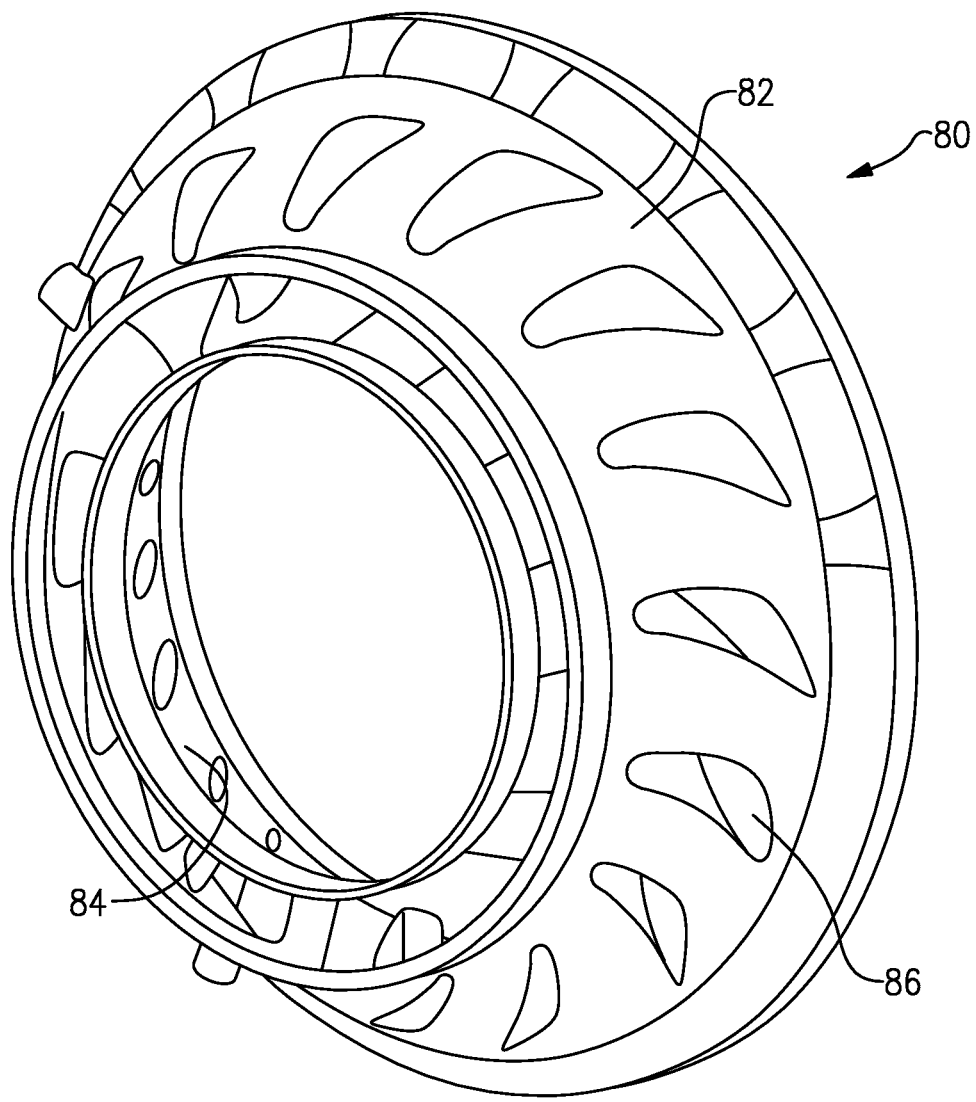
FIG. 2 shows a mid-turbine frame.

FIG. 2 shows a mid-turbine frame 80, which may be utilized in the engine 20 at the location of mid-turbine frame 57 and supporting a bearing 38. While a mid-turbine frame 80 is shown incorporating details of this application, it should be understood that the features of this application can extend to any other location for turbine vanes. The mid-turbine frame 80 has a radially outer platform 82, and a radially inner platform 84. A plurality of airfoils 86, which are hollow, extend between the platforms 82 and 84.

Figure 3:
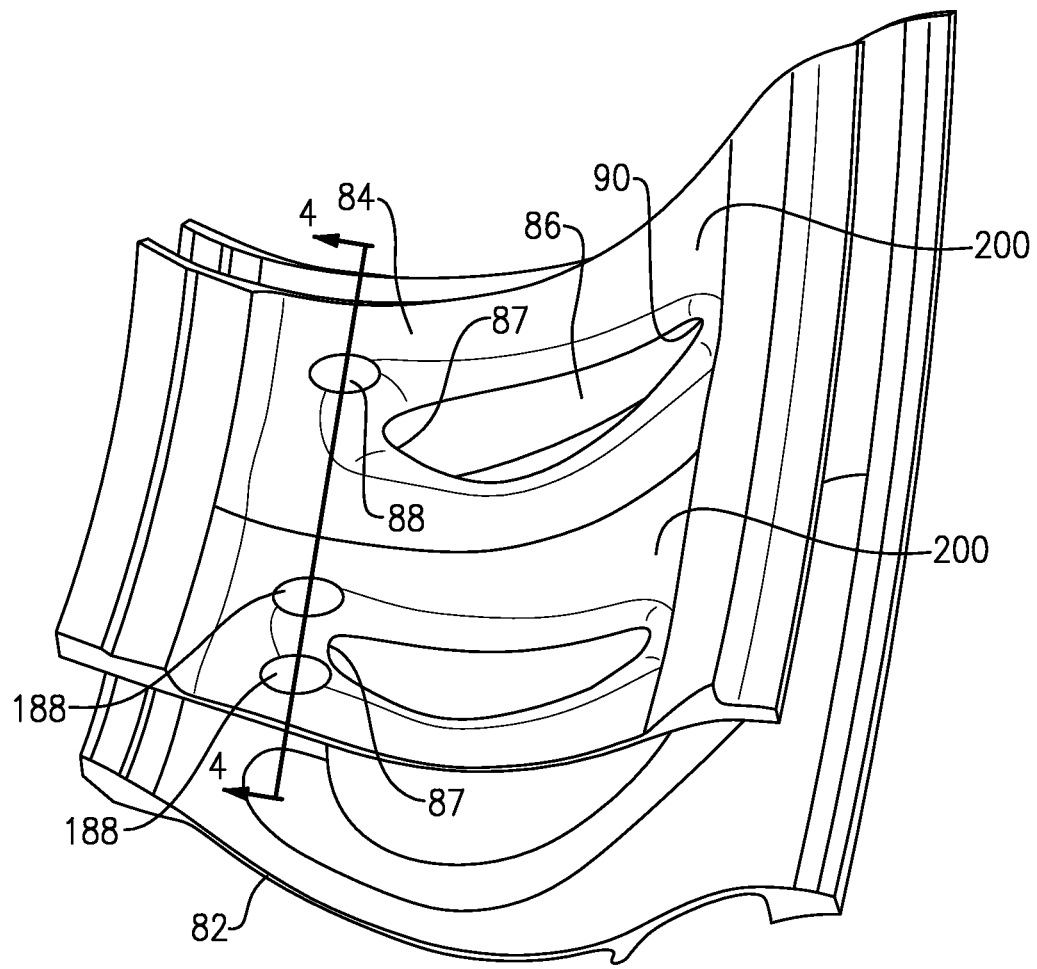
FIG. 3 shows an inner peripheral portion of a vane.

As shown in FIG. 3, the hollow airfoils 86 merge into the platform 84. The hollow airfoils 86 extend from a leading edge 87 to a trailing edge 90. As shown in FIG. 3, the vanes 200 are segmented. Each vane 200 includes an airfoil 86 extending between inner platforms 84 and outer platforms 82. While FIG. 3 shows two vanes connected together, this application would extend to a single vane 200, and of course to a plurality of vanes connected together into a mid-turbine frame 80 such as shown in FIG. 2.

There are stresses which are particular acute at the location where the airfoil 86 merges into the platform 84.

Thus, a localized thicker bump 88 may be placed at a location adjacent to the leading edge 87 and the inner platform surface 84. As an alternative, there may be a plurality of bumps 188 of thickened material.

The thickened material provides additional resistance to the stresses that are particularly acute at the location where the leading edge 87 merges into the inner platform 84.

Figure 4:
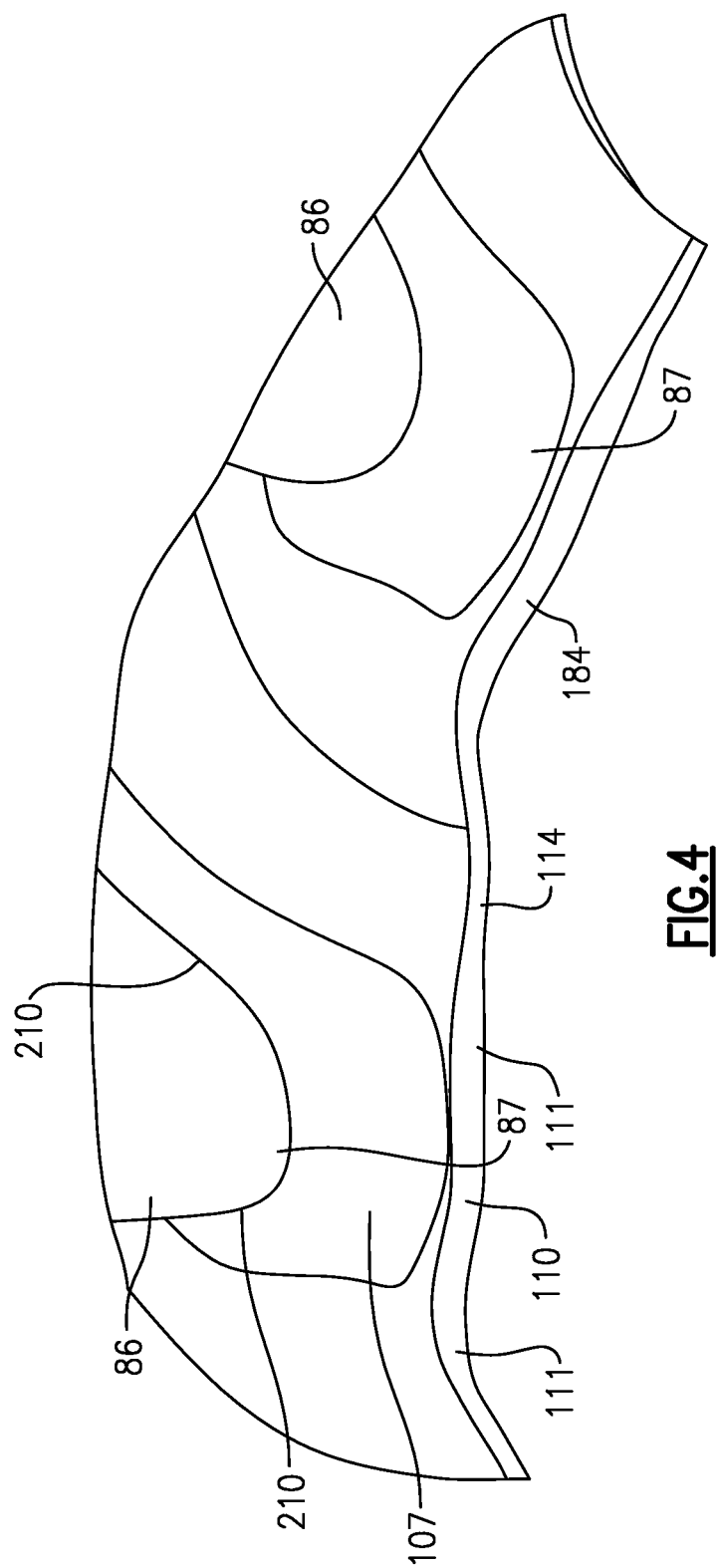
FIG. 4 is a cross-sectional view along line 4-4 of FIG. 3 in an alternative embodiment.

FIG. 4 shows an alternative embodiment where inner platform 184 varies in thickness. As shown, there are thicker portions 110 which extend at least between circumferential ends 111 that extend beyond circumferential ends 200 of the vane 86 at the leading edge 87. Thicker portion 110 can be seen to have increasing thicker areas 107 merging into airfoil 86.

There are thinner portions 114 circumferentially intermediate circumferentially adjacent airfoils 86.

As with the prior embodiment, the variable thickness, and in particular the thicker portions associated with the leading edge 87 provide greater resistance to stress at the more challenging locations.

In embodiments, the thickness of the bumps 88/188 to a thickness at locations spaced from the bumps may be in a ratio equal to or between about 1.1 to 5.0. This ratio can be taken with a thickest portion of the bumps 88/188 to a thinnest location within a circumferential extent between the sides 210 of the airfoil 86. Similarly, a ratio of the thicker portions 110 to the thinner portions 114 may be as high as 1.1 to 5.0. Again, this ratio can be measured at a thickest portion of the variable thickness thicker portion 110 to a nominal thickness at the thinner portion 114. Should the thinner portion 114 also vary, the ratio may be taken at a thinnest portion of the thinner portion 114. As can be appreciated from FIG. 4, the thickness of the thicker portions varies circumferentially across the platform 184.

While the thicker portions 110 and bumps 88/188 are shown at the leading edge 87, they may also be used at the trailing edge 90. Also, although shown, radially inner platform 84, the same type structure could be used at the radially outer platform 82. Note also, as is clear from FIGS. 3 and 4 the thicker portions or bumps and the thinner portions are formed at a radially inner face of the radially inner platform 84.

Although embodiments have been disclosed, a worker of ordinary skill in the art would recognize that certain modifications will come up in a scope of this invention. For that reason, the following claims should be studied to determine the true scope and content.

The invention claimed is:

1. A vane for use in a gas turbine engine comprising:
    an airfoil extending between a leading edge and a trailing edge, and being generally hollow;
    a radially outer platform and a radially inner platform;
    with a radially inner face of said radially inner platform having thicker portions circumferentially located beyond one of said leading edge and said trailing edge, and thinner portions circumferentially beyond circumferential edges of said airfoil;
    said thicker portions are at a location where said airfoil merges into said platform;
    wherein said thicker portions are provided by a least one thicker bump positioned axially beyond said leading edge, but circumferentially aligned with said airfoil; and
    wherein said one of said leading edge and said trailing edge is said leading edge.

2. The vane as set forth in claim 1, wherein there are at least a plurality of said bumps.

3. The vane as set forth in claim 2, wherein a radial thickness of a thickest portion of said bump is defined, and a ratio of said radial thickness of said thickest portion of said bump to a radially thickness of portions circumferentially spaced from said bump is equal to or between 1.1 and 5.0.

4. A mid-turbine frame comprising:
    a plurality of vanes having airfoils extending between a radially inner and a radially outer platform;
    said airfoil shape extending between a leading edge and a trailing edge, and being generally hollow; and
    with a radially inner face of said radially inner platform having thicker portions circumferentially located beyond said leading edge, and thinner portions circumferentially beyond circumferential edges of said airfoil, said thicker portions are at a location where said airfoil merges into said platform; and
    wherein said thicker portions are provided by at least one thicker bump positioned axially beyond said leading edge, but circumferentially aligned with said airfoil.

5. The mid-turbine frame vane as set forth in claim 4, wherein a radial thickness of a thickest portion of said bump is defined, and a ratio of said radial thickness of said thickest portion of said bump to a radially thickness of portions circumferentially spaced from said bump is equal to or between 1.1 and 5.0.

6. The mid-turbine frame as set forth in claim 4, wherein there are at least a plurality of said bumps.

7. A gas turbine engine comprising:
    at least a first upstream turbine rotor and a downstream turbine rotor, with a mid-turbine frame located intermediate said upstream and downstream turbine rotors;
    the mid-turbine frame including a plurality of vanes having a radially outer platform and a radially inner platform, and an airfoil extending between a leading edge and a trailing edge, and being generally hollow; and
    a radially inner face of said radially inner platform having thicker portions circumferentially located beyond said leading edge, and thinner portions circumferentially beyond circumferential edges of said airfoil, said thicker portions are at a location where said airfoil merges into said platform; and
    wherein said thicker portions are provided by at least one thicker bump positioned axially beyond said leading edge, but circumferentially aligned with said airfoil.

8. The gas turbine engine as set forth in claim 7, wherein a radial thickness of a thickest portion of said bump is defined, and a ratio of said radial thickness of said thickest portion of said bump to a radially thickness of portions circumferentially spaced from said bump is equal to or between 1.1 and 5.0.

* * * * *